(12) United States Patent
Wang

(10) Patent No.: US 12,040,899 B2
(45) Date of Patent: Jul. 16, 2024

(54) SERVICE TRANSMISSION AND SERVICE CONFIGURATION SENDING METHODS AND DEVICES, STORAGE MEDIUM, TERMINAL, AND BASE STATION

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 338 days.

(21) Appl. No.: 17/441,012

(22) PCT Filed: Mar. 5, 2020

(86) PCT No.: PCT/CN2020/077915
§ 371 (c)(1),
(2) Date: Sep. 20, 2021

(87) PCT Pub. No.: WO2020/192380
PCT Pub. Date: Oct. 1, 2020

(65) Prior Publication Data
US 2022/0173838 A1 Jun. 2, 2022

(30) Foreign Application Priority Data
Mar. 22, 2019 (CN) .......................... 201910223926.X

(51) Int. Cl.
*H04L 1/1607* (2023.01)
*H04L 1/08* (2006.01)
(Continued)

(52) U.S. Cl.
CPC .............. *H04L 1/1671* (2013.01); *H04L 1/08* (2013.01); *H04L 1/1812* (2013.01);
(Continued)

(58) Field of Classification Search
CPC ....... H04L 1/1671; H04L 1/08; H04L 1/1812; H04L 1/1822; H04L 1/1825; H04L 1/1861; H04L 1/1874
(Continued)

(56) References Cited

U.S. PATENT DOCUMENTS

2005/0276266 A1* 12/2005 Terry ..................... H04L 5/0092
370/394
2009/0086657 A1 4/2009 Alpert et al.
(Continued)

FOREIGN PATENT DOCUMENTS

CN 105101042 A 11/2015
CN 106559877 A 4/2017
(Continued)

OTHER PUBLICATIONS

CATT, "Discussion on physical layer procedures in NR V2X", 3GPP TSG RAN1 Meeting #95, R1-1812618, Nov. 12-16, 2018; 8 pages.
(Continued)

*Primary Examiner* — Obaidul Huq
(74) *Attorney, Agent, or Firm* — CANTOR COLBURN LLP

(57) ABSTRACT

Service transmission and service configuration sending methods and devices, a storage medium, a terminal, and a base station are provided. The service transmission method includes: receiving service configuration information, wherein the service configuration information comprises a correspondence between a service and a quantity of times of data transmission or a correspondence between the service and a quantity of times of data retransmission; and transmitting a candidate service data packet based on the service configuration information.

14 Claims, 7 Drawing Sheets receiving service configuration information, wherein the service configuration information comprises a correspondence between a service and a quantity of times of data transmission or a correspondence between the service and a quantity of times of data retransmission — S101 transmitting a candidate service data packet based on the service configuration information — S102

(51) Int. Cl.
  *H04L 1/1812* (2023.01)
  *H04L 1/1822* (2023.01)
  *H04L 1/1825* (2023.01)
  *H04L 1/1829* (2023.01)
  *H04L 1/1867* (2023.01)

(52) U.S. Cl.
  CPC .......... *H04L 1/1822* (2013.01); *H04L 1/1825* (2013.01); *H04L 1/1861* (2013.01); *H04L 1/1874* (2013.01)

(58) Field of Classification Search
  USPC .................................................. 370/276, 277
  See application file for complete search history.

(56) References Cited

U.S. PATENT DOCUMENTS

| | | |
|---|---|---|
| 2009/0168920 A1 | 7/2009 | Chen |
| 2013/0281141 A1 | 10/2013 | Rubin et al. |
| 2016/0338136 A1* | 11/2016 | Zhang .................. H04W 76/19 |
| 2017/0013082 A1 | 1/2017 | Torii |
| 2017/0196038 A1 | 7/2017 | Zeng et al. |
| 2018/0263052 A1 | 9/2018 | Xu et al. |
| 2018/0317124 A1 | 11/2018 | Wu et al. |
| 2019/0052436 A1 | 2/2019 | Desai et al. |
| 2019/0053008 A1 | 2/2019 | He et al. |
| 2019/0166609 A1* | 5/2019 | Xu ........................ H04W 72/04 |
| 2020/0092692 A1 | 3/2020 | Wang et al. |
| 2020/0213980 A1 | 7/2020 | Takeda et al. |

FOREIGN PATENT DOCUMENTS

| | | |
|---|---|---|
| CN | 107105000 A | 8/2017 |
| CN | 107359971 A | 11/2017 |
| CN | 108923894 A | 11/2018 |
| CN | 110139239 A | 8/2019 |
| EP | 2255476 B1 | 12/2012 |
| JP | 2007124496 A | 5/2007 |
| JP | 2012257199 A | 12/2012 |
| JP | 2014532340 A | 12/2014 |
| JP | 2015167268 A | 9/2015 |
| WO | 2015133067 A1 | 9/2015 |
| WO | 2017030393 A1 | 2/2017 |
| WO | 2017039417 A1 | 3/2017 |
| WO | 2018171540 A1 | 9/2018 |
| WO | 2019016952 A1 | 1/2019 |

OTHER PUBLICATIONS

JPO First Office Action for corresponding JP Application No. 2021-556708; Issued on Jan. 6, 2023.
International Search Report for International Application No. PCT/CN2020/077915; Date of Mailing, May 27, 2020.
ZTE, "Scheduling Assignment enhancement for V2V" 3GPP TSG-RAN WG1 Meeting #84; R1-160683; St. Julian's, Malta, Feb. 15-19, 2016; 6 pages.
EPO European Office Action for corresponding EP Application No. 20777442.3; Issued on May 30, 2023.
EPO Extended European Search Report for corresponding EP Application No. 20777442.3; Issued on Mar. 31, 2022.
JPO Decision of Refusal for corresponding JP Application No. 2021-556708; Mailing Date, Jul. 21, 2023.

* cited by examiner receiving service configuration information, wherein the service configuration information comprises a correspondence between a service and a quantity of times of data transmission or a correspondence between the service and a quantity of times of data retransmission ⟵ S101 transmitting a candidate service data packet based on the service configuration information ⟵ S102

FIG. 1 configuring service configuration information, wherein the service configuration information comprises a correspondence between a service and a quantity of times of data transmission or a correspondence between the service and a quantity of times of data retransmission ⟵ S201 sending the service configuration information ⟵ S202

FIG. 2

SERVICE TRANSMISSION AND SERVICE CONFIGURATION SENDING METHODS AND DEVICES, STORAGE MEDIUM, TERMINAL, AND BASE STATION

CROSS-REFERENCE TO RELATED APPLICATIONS

The is the national stage of International Application No. PCT/CN2020/077915, filed on Mar. 5, 2020. Priority under 35 U.S.C. § 119(a) and 35 U.S.C. § 365(b) is claimed from Chinese Patent Application No. 201910223926.X, filed on Mar. 22, 2019, and entitled "SERVICE TRANSMISSION AND SERVICE CONFIGURATION SENDING METHODS AND DEVICES, STORAGE MEDIUM, TERMINAL, AND BASE STATION", the entire disclosure of which is also incorporated herein by reference.

TECHNICAL FIELD

The present disclosure relates to the field of wireless communication technology, and in particular to a service transmission method, a service transmission device, a method for sending service configuration, a device for sending service configuration, storage medium, a terminal and a base station.

BACKGROUND

Information exchange between a vehicle and the outside world (Vehicle to X, called as V2X for short, which may also called as vehicle to everything) is a key technology of a future intelligent transportation system. A main research focus on a vehicle data transmission scheme based on the 3rd Generation Partnership Project (called as 3GPP for short) communication protocol. V2X communications includes Vehicle to Vehicle (called as V2V for short) communications, Vehicle to Infrastructure (called as V2I for short) communications, and Vehicle to Pedestrian (called as V2P for short) communications. V2X applications improve driving safety, reduce congestion and vehicle energy consumption, improve a traffic efficiency and in-vehicle entertainment information or the like.

In the Long Term Evolution (called as LTE for short) communication system, V2X communication is based on broadcast communication and adopts a "one-to-all" communication mode. In this communication mode, a receiving terminal does not need to feed back to a sending terminal whether the data is received successfully. If transmission for once is insufficient to meet a reliability requirement of a service, the sending terminal may retransmit a data packet based on a preset quantity of times without feedback information.

In a New Radio (called as NR for short) communication system of the fifth-generation mobile communication technology (5th-Generation, called as 5G for short), unicast V2X communication is introduced and a "one-to-one" communication mode is adopted. In this case, by Hybrid Automatic Repeat reQuest (called as HARQ for short) ACKnowledgement/Non-ACKnowledgement (called as ACK/NACK for short) mechanism, the receiving terminal can feed back to the sending terminal whether the data is received successfully. ACKnowledgement (ACK) indicates that the data is received successfully, and Non-ACKnowledgement (NACK) indicates that the data is not received successfully. If the data is not received successfully, the sending terminal may perform retransmission. Compared with retransmission without feedback information, retransmission with feedback information improves a resource utilization.

Although retransmission can increase a probability of successful data transmission and improve reliabilities of V2X services, not all V2X services require retransmission. Different V2X services have different reliability requirements. In other words, there are services with high reliability requirements and services with low reliability requirements in V2X. For some V2X services, retransmission is not required, and transmission for once can meet the reliability requirements of the services. For other services, they may require retransmission for once, retransmission for twice, or even retransmission for three times or four times.

In a case that the sending terminal only sends services with low reliability requirements, the retransmission is redundant, which may result in a decrease in resource utilization. Therefore, redundant retransmissions need to be avoided.

SUMMARY

Embodiments of the present disclosure provide a method for avoiding the redundant retransmission of data in V2X communication.

A service transmission method is provided according to an embodiment of the present disclosure. The service transmission method includes: receiving service configuration information, where the service configuration information includes a correspondence between a service and a quantity of times of data transmission or a correspondence between the service and a quantity of times of data retransmission; and transmitting a candidate service data packet based on the service configuration information.

In some embodiment, the service transmission method further includes: recording, by a counter, a quantity of times that the candidate service data packet is transmitted.

In some embodiment, the recording, by a counter, a quantity of times that the candidate service data packet is transmitted includes: setting a count value of the counter to 0 when the candidate service data packet is transmitted for the first time; and increasing the count value of the counter by one when the candidate service data packet is retransmitted once.

In some embodiment, the service configuration information includes the correspondence between a service and a quantity of times of data transmission, and the recording, by a counter, a quantity of times that the candidate service data packet is transmitted includes: determining a maximum of times of transmission of the candidate service data packet based on the correspondence between a service and a quantity of times of data transmission; setting a count value of the counter to the maximum of times of transmission when the candidate service data packet is transmitted for the first time; and decreasing the count value of the counter by one when the candidate service data packet is retransmitted once.

In some embodiment, the service configuration information includes the correspondence between a service and a quantity of times of data retransmission, and the recording, by a counter, a quantity of times that the candidate service data packet is transmitted includes: determining a maximum of times of retransmission of the candidate service data packet based on the correspondence between a service and a quantity of times of data retransmission; setting a count value of the counter to the maximum of times of retransmission when the candidate service data packet is transmitted for the first time; and decreasing the count value of the counter by one when the candidate service data packet is retransmitted once.

In some embodiment, the service transmission method further includes: instructing a receiving terminal to send confirmation information to a base station, to make the receiving terminal send confirmation information generated by the receiving terminal to the base station, in a case that the count value of the counter meets a preset condition; or generating confirmation information and sending the confirmation information to the base station, in a case that the count value of the counter meets the preset condition.

In some embodiment, the service transmission method further includes: emptying an HARQ buffer occupied by an HARQ process corresponding to the candidate service data packet, in a case that the count value of the counter meets a preset condition.

In some embodiment, the service transmission method further includes: releasing, if a transmission resource is a retransmission resource of an HARQ process corresponding to the candidate service data packet, the transmission resource in a case that the count value of the counter meets a preset condition.

In some embodiment, the service transmission method further includes: sending sidelink control information to a receiving terminal.

In some embodiment, before sending the sidelink control information to the receiving terminal, the service transmission method further includes: setting a time gap between initial transmission and retransmission in the sidelink control information to 0 or a time interval between a current transmission resource and a next new transmission resource, in a case that the count value of the counter meets a preset condition.

In order to solve the above technical problem, a method for sending service configuration is provided according to an embodiment of the present disclosure. The method includes: configuring service configuration information, where the service configuration information includes a correspondence between a service and a quantity of times of data transmission or a correspondence between the service and a quantity of times of data retransmission; and sending the service configuration information.

A service transmission device is provided according to an embodiment of the present disclosure. The service transmission device includes: a receiving circuitry, configured to receive service configuration information, where the service configuration information includes a correspondence between a service and a quantity of times of data transmission or a correspondence between the service and a quantity of times of data retransmission; and a configuration circuitry, configured to transmit a candidate service data packet based on the service configuration information.

A device for sending service configuration is provided according to an embodiment of the present disclosure. The device for sending service configuration includes: a configuration circuitry, configured to configure service configuration information, where the service configuration information includes a correspondence between a service and a quantity of times of data transmission or a correspondence between the service and a quantity of times of data retransmission; and a sending circuitry, configured to send the service configuration information.

A signaling sending method is provided according to an embodiment of the present disclosure. The signaling sending method includes: determining a reliability requirement of a candidate service data packet based on a reliability requirement of each service included in the candidate service data packet; and sending the reliability requirement of the candidate service data packet.

In some embodiment, the sending the reliability requirement of the candidate service data packet includes: sending the reliability requirement of the candidate service data packet based on sidelink control information.

In some embodiment, the signaling sending method further includes: before sending the reliability requirement of the candidate service data packet, taking a highest reliability requirement among reliability requirements of all services included in the candidate service data packet as the reliability requirement of the candidate service data packet.

In some embodiment, the sending the reliability requirement of the candidate service data packet includes: determining a service identifier of the candidate service data packet; and sending the service identifier of the candidate service data packet.

In some embodiment, the sending the reliability requirement of the candidate service data packet includes: if a HARQ feedback message of a receiving terminal is forwarded to a base station, sending the reliability requirement of the candidate service data packet when the HARQ feedback message is forwarded to the base station.

In some embodiment, the sending the reliability requirement of the candidate service data packet includes: determining a service identifier of the candidate service data packet; if a HARQ feedback message of a receiving terminal is forwarded to a base station, sending the service identifier of the candidate service data packet when the HARQ feedback message is forwarded to the base station, to make the base station determine the reliability requirement of the candidate service data packet.

A signaling receiving method is provided according to an embodiment of the present disclosure. The signaling receiving method includes: receiving a reliability requirement of a candidate service data packet sent by a sending terminal, where the reliability requirement of the candidate service data packet is determined by the sending terminal based on a reliability requirement of each service included in the candidate service data packet; and sending the reliability requirement of the candidate service data packet to the base station when an HARQ feedback message is sent to the base station.

In some embodiment, the receiving a reliability requirement of a candidate service data packet sent by a sending terminal includes: receiving, based on sidelink control information, the reliability requirement of the candidate service data packet sent by the sending terminal.

In some embodiment, the reliability requirement of the candidate service data packet is a highest reliability requirement among reliability requirements of all services included in the candidate service data packet.

In some embodiment, the receiving a reliability requirement of a candidate service data packet sent by a sending terminal includes: receiving a service identifier of the candidate service data packet sent by the sending terminal.

In some embodiment, the sending the reliability requirement of the candidate service data packet to the base station when an HARQ feedback message is sent to the base station includes: sending the service identifier of the candidate service data packet to the base station when the HARQ feedback message is sent to the base station, to make the base station determine the reliability requirement of the candidate service data packet.

In some embodiment, the sending the reliability requirement of the candidate service data packet to the base station when an HARQ feedback message is sent to the base station includes: determining an HARQ feedback resource to be used by the HARQ feedback message based on a pre-configured mapping relationship between HARQ feedback resources and reliability requirements; and sending the HARQ feedback message to the base station by the determined HARQ feedback resource.

In some embodiment, the sending the reliability requirement of the candidate service data packet to the base station when an HARQ feedback message is sent to the base station includes: determining an HARQ feedback resource to be used by the HARQ feedback message based on a pre-configured mapping relationship between service identifiers and HARQ feedback resources; and sending the HARQ feedback message to the base station by the determined HARQ feedback resource.

A method for updating an HARQ buffer is provided according to an embodiment of the present disclosure. The method includes: determining an HARQ process status of a candidate service data packet; and emptying an HARQ buffer occupied by an HARQ process corresponding to the candidate service data packet, in a case that the HARQ process status of the candidate service data packet is ACK.

In some embodiment, the method for updating an HARQ buffer further includes: setting a time gap between initial transmission and retransmission in the SCI to 0 or a time interval between a current transmission resource and a next new transmission resource, in a case that the HARQ process status of the candidate service data packet is ACK; and sending the SCI.

In some embodiment, the method for updating an HARQ buffer further includes: releasing, if a transmission resource is a retransmission resource of an HARQ process corresponding to the candidate service data packet, the transmission resource in a case that the HARQ process status of the candidate service data packet is ACK.

A signaling sending device is provided according to an embodiment of the present disclosure. The signaling sending device includes: a determining circuitry, configured to determine a reliability requirement of a candidate service data packet based on a reliability requirement of each service included in the candidate service data packet; and a sending circuitry, configured to send the reliability requirement of the candidate service data packet.

A signaling receiving device is provided according to an embodiment of the present disclosure. The signaling receiving device includes: a receiving circuitry, configured to receive a reliability requirement of a candidate service data packet sent by a sending terminal, where the reliability requirement of the candidate service data packet is determined by the sending terminal based on a reliability requirement of each service included in the candidate service data packet; and a sending circuitry, configured to send the reliability requirement of the candidate service data packet to the base station when the sending circuitry sends an HARQ feedback message to the base station.

A device for updating an HARQ buffer is provided according to an embodiment of the present disclosure. The device includes: a determining circuitry, configured to determine an HARQ process status of a candidate service data packet; an emptying circuitry, configured to empty an HARQ buffer occupied by an HARQ process corresponding to the candidate service data packet, in a case that the HARQ process status of the candidate service data packet is ACK.

A storage medium is provided according to an embodiment of the present disclosure. The storage medium stores computer instructions. The computer instructions perform the above method when the computer instructions are executed.

A terminal is provided according to an embodiment of the present disclosure. The terminal includes a memory and a processor. The memory stores computer instructions capable of being executed on the processor. The processor performs the above method when the computer instructions are executed by the processor.

A base station is provided according to an embodiment of the present disclosure. The base station includes a memory and a processor. The memory stores computer instructions capable of being executed on the processor. The processor performs the above method when the computer instructions are executed by the processor.

BRIEF DESCRIPTION OF THE DRAWINGS

FIG. 1 is a schematic flowchart of a service transmission method according to an embodiment of the present disclosure;

FIG. 2 is a schematic flowchart of a method for sending service configuration according to an embodiment of the present disclosure;

DETAILED DESCRIPTION

Figure 3:
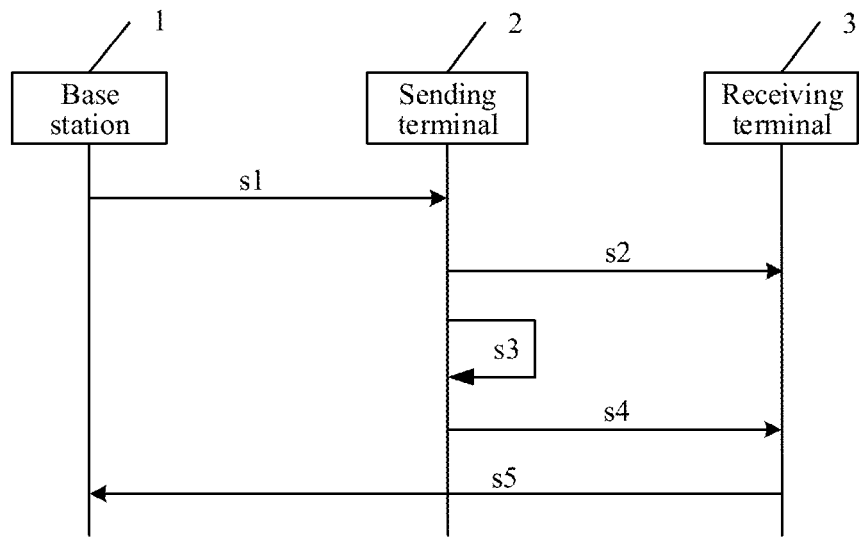
FIG. 3 is a schematic diagram of signaling interaction in a typical scenario according to an embodiment of the present disclosure.

As mentioned in the background part, when the transmitted V2X service is a service with a low reliability requirement, the retransmission may be redundant, which results in a decrease in a resource utilization.

Specifically, when data is transmitted, regardless of initial transmission or retransmission, a transmission resource is obtained firstly. In NR V2X, there are two modes, i.e., mode 1 and mode 2, to obtain the transmission resource. In mode 1, a sending terminal obtains a transmission resource from a base station, and then sends data to a receiving terminal by the obtained transmission resource. In mode 2, the sending terminal selects, by means of sensing or detecting, a resource meeting the demand from a set of resources for data transmission. The resource may be a resource that is not occupied by other User Equipments (called as UE for short), or the resource may be a resource that is occupied by other UEs but has little interference intensity.

The sending terminal may only obtain the resource for current transmission, or may obtain the resources required for the initial transmission and all subsequent retransmissions at one time.

When the sending terminal sends data to the receiving terminal by the obtained resource, in addition to sending the data, the sending terminal also sends Sidelink control information (called as SCI for short). The SCI may carry control information related to scheduling, which is used to instruct the receiving terminal to correctly receive data.

If the receiving terminal needs to perform feedback, feedback information also needs to be carried by a radio resource. For mode 1, the resource used for feedback is usually also provided by the base station, and for mode 2, the resource used for feedback is usually also selected by the sending terminal from a set of resources.

When mode 1 is adopted, the data sent by the sending terminal may be data with a relatively low reliability requirement. If the receiving terminal does not successfully receive the data, the receiving terminal may feed back to the sending terminal or the base station. At this time, since the base station does not know the reliability requirements of the data, the base station may instruct the sending terminal to retransmit the data, which results in a waste of resources and reduces a resource utilization.

In order to solve the above technical problem, a service transmission method is provided according to an embodiment of the present disclosure. The service transmission method includes: receiving service configuration information, where the service configuration information includes a correspondence between a service and a quantity of times of data transmission or a correspondence between the service and a quantity of times of data retransmission; transmitting a candidate service data packet based on the service configuration information. In the embodiment of the present disclosure, after obtaining the service configuration information configured by a base station, a sending terminal learns the correspondence between each service and the quantity of times of data transmission/data retransmission, and sends data based on the correspondence and a reliability of the candidate service data packet, thereby effectively avoiding redundant retransmissions and improving a resource utilization.

A signaling sending method is provided according to an embodiment of the present disclosure. The signaling sending method includes: determining a reliability requirement of a candidate service data packet based on a reliability requirement of each service included in the candidate service data packet; and sending the reliability requirement of the candidate service data packet. In the embodiment of the present disclosure, a terminal knows the reliability requirement of each candidate service data packet, and sends the reliability requirement to notify the base station of the reliability requirement of the candidate service data packet, then the base station determines whether to schedule a retransmission resource based on the reliability requirement, thereby providing a feasible solution for avoiding redundant retransmissions, and improving a resource utilization.

In order to make the above objectives, features and beneficial effects of the present disclosure more apparent and understandable, specific embodiments of the present disclosure are described in detail below with reference to the accompanying drawings.

The technical solutions provided by the embodiments of the present disclosure are applicable to 5G communication systems, 4G communication systems, 3G communication systems, and various communication systems that are subsequently evolved.

The technical solutions provided by the embodiments of the present disclosure are also applicable to different network architectures, including but not limited to a relay network architecture, a dual-link network architecture, and a vehicle networking communication architecture.

The Base Station (called as BS for short) in the embodiment of the present disclosure may also be referred to as base station device, and is a device deployed in a wireless access network to provide wireless communication functions. For example, devices that provide base station functions in the 2G network include a Base transceiver station (called as BTS for short) and a Base Station Controller (called as BSC for short). Devices that provide base station functions in the 3G network include a NodeB and a Radio Network Controller (called as RNC for short). Devices that provide base station functions in the 4G network include an Evolved NodeB (called as eNB for short). In a Wireless Local Area Network (called as WLAN for short), a device that provides a base station function is an Access Point (called as AP for short). Devices that provide base station functions in the 5G New Radio (called as NR for short) include next generation Node B (gNB), and the base station also refers to devices that provide base station functions in a new communication system in the future.

The terminal (for example, the sending terminal and/or the receiving terminal) in the embodiment of the present disclosure may refer to various forms of User Equipment (called as UE for short), an access terminal, a user unit, a user station, a mobile station, a Mobile Station (called as MS for short), a remote station, a remote terminal, a mobile device, a user terminal, a terminal equipment, a wireless communication device, a user agent or a user device. The terminal device may also be a cellular phone, a cordless phone, a Session Initiation Protocol (called as SIP for short) phone, a Wireless Local Loop (called as WLL for short) station, a Personal Digital Assistant (PDA), a handheld device with wireless communication functions, a computing devices or other processing devices connected to wireless modems, an in-vehicle device, a wearable device, a terminal device in the future 5G network, or a terminal device in future evolved Public Land Mobile Network (called as PLMN for short), which is not limited in the embodiment of the present disclosure.

In the embodiment of the present disclosure, a unidirectional communication link from an access network to a terminal is defined as the downlink, and data transmitted in the downlink is downlink data, and a transmission direction of the downlink data is called as a downlink direction. A unidirectional communication link from the terminal to the access network is defined as the uplink, and data transmitted in the uplink is uplink data, and a transmission direction of the uplink data is called as an uplink direction.

It should be understood that the term "and/or" in this specification is only an association relationship for describing associated objects, and indicates that there may be three types of relationships. For example, A and/or B may mean that A alone exists, both A and B exist, and B alone exists. In addition, the character "/" in this specification indicates that the associated objects before the character "/" and after the character "/" are in an "or" relationship.

The "multiple" in the embodiments of the present disclosure refers to two or more.

The description "first", "second" or the like appearing in the embodiments of the present disclosure are only used to illustrate and distinguish descripted objects, and do not mean an order. The description "first", "second" or the like do not limit the number of devices in the embodiments of the present disclosure, and do not constitute any limitations to embodiments of the present disclosure.

The "connection" in the embodiment of the present disclosure refers to various connection modes such as direct connection or indirect connection to realize communication between devices, which is not limited in the embodiment of the present disclosure.

The "network" and "system" appearing in the embodiments of the present disclosure express the same concept, and a communication system means a communication network.

FIG. 1 is a schematic flowchart of a service transmission method according to an embodiment of the present disclosure. The service transmission method may be performed by a terminal, for example, a NR V2X UE. Specifically, the service transmission method may include following S101 and S102.

In S101, receiving service configuration information, wherein the service configuration information comprises a correspondence between a service and a quantity of times of data transmission or a correspondence between the service and a quantity of times of data retransmission.

In S102, transmitting a candidate service data packet based on the service configuration information.

More specifically, a base station (for example, NR gNB) may configure service configuration information. The service configuration information may include a correspondence between a service and a quantity of times of data transmission. Alternatively, the service configuration information may include a correspondence between the service and a quantity of times of data retransmission.

The base station may send the service configuration information to a first terminal, for example, the first terminal is a sending terminal.

It should be noted that, the service may be characterized by at least one of: LogicalChannel (called as LCH for short), LogicalChannel Group (called as LCG for short), Destination, Destination index, and Quality of Service (called as QoS for short) parameter, which is not limited in the present disclosure.

Specifically, in a case that the service is characterized by a LogicalChannel, the service configuration information includes a correspondence between the LogicalChannel and a quantity of times of data transmission, or the service configuration information includes a correspondence between the LogicalChannel and a quantity of times of data retransmission. In a case that the service is characterized by a specific QoS parameter, the service configuration information includes a correspondence between the QoS parameter and a quantity of times of data transmission, or the service configuration information includes a correspondence between the QoS parameter and a quantity of times of data retransmission. In a case that the service is characterized by a LogicalChannel and a Destination, the service configuration information includes a correspondence between the LogicalChannel and the Destination and a quantity of times of data transmission, or the service configuration information includes a correspondence between the LogicalChannel and the Destination and a quantity of times of data retransmission.

Specifically, the Quality of Service parameter includes at least one of the following parameters: priority, delay budget, reliability, error rate, and data rate.

In S101, the first terminal may receive the service configuration information from the base station, thereby knowing the correspondence between a service and a quantity of times of data transmission or the correspondence between the service and a quantity of times of data retransmission.

In S102, the first terminal may transmit a candidate service data packet to a second terminal (for example, the second terminal is a receiving terminal) based on the service configuration information.

In a non-limiting embodiment, the base station configures the correspondence between a service and a quantity of times of transmission through the service configuration information. For example, in a case that the base station configures the quantity of times of transmission of a first service to 1 through the service configuration information, it means that the data of the first service only needs to be transmitted once.

In another non-limiting embodiment, the base station configures the correspondence between a service and a quantity of times of retransmission through the service configuration information. For example, a case that the quantity of times of retransmission of the first service is 1 means that the data of the first service may be retransmitted once (that is, the first service may be transmitted twice in total).

Furthermore, the first terminal may maintain a counter, and use the counter to record a quantity of times that the candidate service data packet is transmitted.

The candidate service data packet may include one or more services, and the one or more services may correspond to the same quantity of times of data transmission or the same quantity of times of data retransmission, or the one or more services may correspond to different quantities of times of data transmission or different quantities of times of data retransmission.

In an embodiment, a count value of the counter may be initialized to 0 when the candidate service data packet is transmitted for the first time; and the count value of the counter is increased by one when the candidate service data packet is retransmitted once. The maximum count value of the counter may be (N-1). N represents a quantity of times of transmission of the candidate service data packet. N is determined by the quantity of times of data transmission corresponding to the service included in the candidate service data packet, N is a positive integer. In this counting mode, a case that the count value equals to N is taken as a preset condition.

In a modified embodiment, N=N1, N1 represents a quantity of times of data transmission corresponding to a service having a maximum of times of data transmission among the services included in the candidate service data packet.

In a modified embodiment, the count value of the counter may be initialized to 0 when the candidate service data packet is transmitted for the first time; and the count value of the counter is increased by one when the candidate service data packet is retransmitted once. The maximum count value of the counter may be M. M represents a quantity of times of retransmission of the candidate service data packet. M is determined by the quantity of times of data retransmission corresponding to the service included in the candidate service data packet, M is a positive integer. In this counting mode, a case that the count value equals to M is taken as a preset condition.

In a modified embodiment, M=M1, M1 represents a quantity of times of data retransmission corresponding to a service having a maximum of times of data transmission among the services included in the candidate service data packet.

In a modified embodiment, the count value of the counter may be initialized to N when the candidate service data packet is transmitted for the first time. N represents a quantity of times of transmission of the candidate service data packet. N is determined by the quantity of times of data transmission corresponding to the service included in the candidate service data packet, N is a positive integer. The count value of the counter is decreased by one when the candidate service data packet is retransmitted once, until the count value of the counter is decreased to 1. In this counting mode, a case that N is decreased to 1 is taken as a preset condition.

In a modified embodiment, the count value of the counter may be initialized to M when the candidate service data packet is transmitted for the first time. The count value of the counter is decreased by one when the candidate service data packet is retransmitted once, until the count value of the counter is decreased to 0. M represents a quantity of times of retransmission of the candidate service data packet. M is determined by the quantity of times of data transmission corresponding to the service included in the candidate service data packet, M is a positive integer. In this counting mode, a case that M is decreased to 0 is taken as a preset condition.

Furthermore, in a case that an HARQ message is sent by the second terminal to the base station and the count value of the counter meets a preset condition, the first terminal may instruct the second terminal to send an ACK to the base station. It should be noted that, regardless of whether the second terminal successfully receives the candidate service data packet, the second terminal feeds back an ACK to the base station in a case that the count value of the counter meets a preset condition.

In a modified embodiment, in a case that an HARQ message is sent by the first terminal to the base station and the count value of the counter meets a preset condition, regardless of whether the HARQ message fed back by the second terminal to the first terminal is an ACK or a NACK, the first terminal generates an ACK and sends the ACK to the base station.

In a modified embodiment, in a case the count value of the counter meets a preset condition, the first terminal empties an HARQ buffer occupied by an HARQ process corresponding to the candidate service data packet.

In a modified embodiment, in a case that the count value of the counter meets a preset condition, if the first terminal determines that a transmission resource is a retransmission resource of an HARQ process corresponding to the candidate service data packet, the first terminal releases the transmission resource.

In a modified embodiment, in a case that the count value of the counter meets a preset condition, before sending the Sidelink Control Information (called as SCI for short) to the second terminal, a time gap between initial transmission and retransmission in the sidelink control information is set to 0 or a time interval between a current transmission resource and a next new transmission resource.

It should be noted that, the time gap between initial transmission and retransmission may also be other time gaps used to characterize an time interval between the current transmission resource and a next transmission resource. Preferably, the current transmission resource and the next transmission resource may be transmission resources belonging to the same HARQ process, which is not limited in the embodiment of the present disclosure.

FIG. 2 is a schematic flowchart of another service transmission method according to an embodiment of the present disclosure. The service transmission method may be performed by a base station on the network side, for example, an NR V2X gNB. Specifically, the service transmission method may include the following S201 to S202.

In S201, configuring service configuration information, wherein the service configuration information comprises a correspondence between a service and a quantity of times of data transmission or a correspondence between the service and a quantity of times of data retransmission.

In S202, sending the service configuration information.

More specifically, the base station may configure the service configuration information for the service. The service configuration information may include a correspondence between a service and a quantity of times of data transmission or a correspondence between the service and a quantity of times of data retransmission. Then the base station sends the service configuration information. For example, the base station sends the service configuration information to each terminal.

Those skilled in the art understand that, S201 to S202 may be regarded as the method corresponding to S101 to S102 in the embodiment shown in FIG. 1. Specific implementation principles and logic of S201 to S202 and specific implementation principles and logic of S101 to S102 are complementary. Therefore, for the explanation of the terms involved in this embodiment, reference may be made to the related description of the embodiment shown in FIG. 1, which is not repeated here.

The signaling interaction between the first terminal, the second terminal and the NR V2X base station according to the embodiment of the disclosure are described below in conjunction with typical application scenarios.

In a typical application scenario, referring to FIG. 3, a process that a base station 1, a sending terminal 2 and a receiving terminal 3 use mode 1 for data transmission and the receiving terminal 3 feeds back HARQ information to the base station 1 may include following s1 to s5.

Firstly, the base station 1 performs the s1. That is, base station 1 sends service configuration information to the sending terminal 2. The service configuration information may include a correspondence between a service and a quantity of times of data transmission or a correspondence between the service and a quantity of times of data retransmission.

Secondly, the sending terminal 2 performs the s2. That is, after receiving the service configuration information, the sending terminal 2 sends a candidate service data packet to the receiving terminal 3 based on the service configuration information.

Thirdly, the sending terminal 2 performs the s3. That is, the sending terminal 2 uses a counter to record the quantity of times that the candidate service data packet is transmitted. During the counting process, the sending terminal 2 performs data reception and data sending with the receiving terminal 3 and the base station (not shown in the drawing).

Then the sending terminal 2 performs the s4. That is, when the counter meets a preset condition, the sending terminal 2 instructs the receiving terminal 3 to send confirmation information to the base station 1. The preset condition refers to a case that the count value of the counter is equal to (N-1), N represents a quantity of times of transmission of the candidate service data packet, N is determined by the quantity of times of data transmission corresponding to the service included in the candidate service data packet, N may equal to a quantity of times of data transmission corresponding to a service having a maximum of times of data transmission among the services included in the candidate service data packet, and N is a positive integer. Alternatively, the preset condition refers to a case that the count value of the counter is equal to M, M represents a quantity of times of retransmission of the candidate service data packet, M is determined by the quantity of times of data retransmission corresponding to the service included in the candidate service data packet, M may equal to a quantity of times of data retransmission corresponding to a service having a maximum of times of data retransmission among the services included in the candidate service data packet, and M is a positive integer. Alternatively, the preset condition refers to a case that the count value of the counter is equal to 0 or 1. The preset condition is defined by an operation mode of the counter and the service configuration information.

Furthermore, regardless of whether the receiving terminal 3 receives correctly, the receiving terminal 3 performs the s5. That is, the receiving terminal 3 generates a confirmation message, and sends the generated confirmation message to the base station 1.

For more details on the operation principles and operation modes of the base station 1, the sending terminal 2 and the receiving terminal 3 in the application scenario shown in FIG. 3, reference may be made to the related descriptions for the foregoing FIG. 1 and FIG. 2, which are not repeated here.

Figure 4:
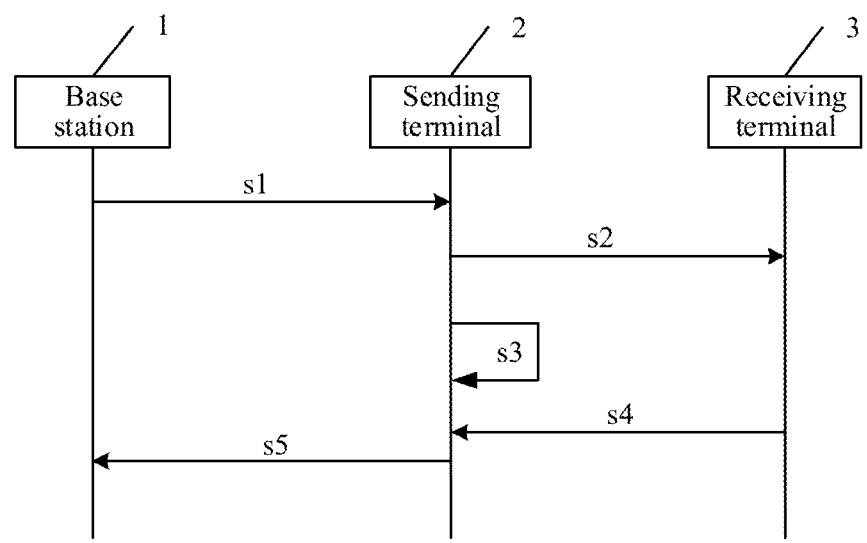
FIG. 4 is a schematic diagram of signaling interaction in a typical scenario according to another embodiment of the present disclosure.

In a typical application scenario, referring to FIG. 4, a process that a base station 1, a sending terminal 2 and a receiving terminal 3 use mode 1 for data transmission and the receiving terminal 3 feeds back HARQ information to the sending terminal 2 for data transmission may include following s1 to s5.

Firstly, the base station 1 performs the s1. That is, base station 1 sends service configuration information to the sending terminal 2. The service configuration information may include a correspondence between a service and a quantity of times of data transmission or a correspondence between the service and a quantity of times of data retransmission.

Secondly, the sending terminal 2 performs the s2. That is, after receiving the service configuration information, the sending terminal 2 sends a candidate service data packet to the receiving terminal 3 based on the service configuration information.

Thirdly, the sending terminal 2 performs the s3. That is, the sending terminal 2 uses a counter to record the quantity of times that the candidate service data packet is transmitted. During the counting process, the sending terminal 2 performs data reception and data sending with the receiving terminal 3 and the base station (not shown in the drawing).

Then the sending terminal 2 performs the s4. That is, when the counter meets a preset condition, the sending terminal 2 receives an HARQ message sent from the receiving terminal 3. The meaning of the preset condition may be referred to the above, and is not be repeated here.

Furthermore, the sending terminal 2 performs the s5. That is, regardless of whether the HARQ message sent by the receiving terminal 3 is an ACK, the sending terminal 2 generates an ACK and sends the ACK to the base station 1.

For more details on the operation principles and operation modes of the base station 1, the sending terminal 2 and the receiving terminal 3 in the application scenario shown in FIG. 4, reference may be made to the related descriptions for the foregoing FIG. 1 and FIG. 2, which are not repeated here.

It can be seen from above that, when V2X communication is performed by the technical solutions provided by the embodiments of the present disclosure, redundant retransmissions can be effectively avoided, and a resource utilization can be improved.

Figure 5:
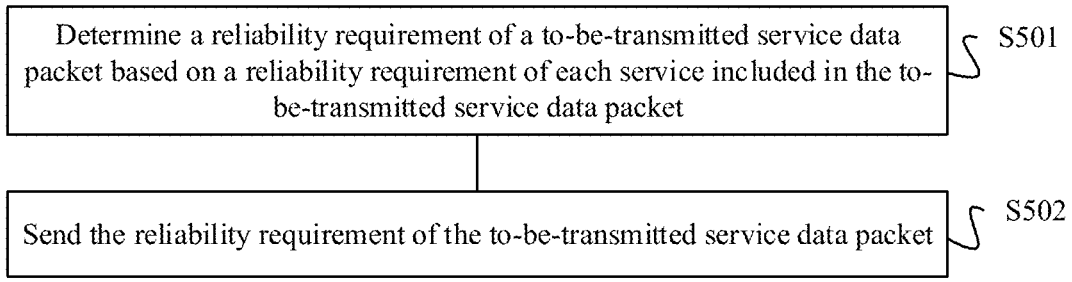
FIG. 5 is a schematic flowchart of a signaling sending method according to an embodiment of the present disclosure.

FIG. 5 is a schematic flowchart of a signaling sending method according to an embodiment of the present disclosure. The signaling sending method may be performed by a terminal, for example, a NR V2X UE. Specifically, the signaling sending method may include the following S501 to S502.

In S501, determine a reliability requirement of a candidate service data packet based on a reliability requirement of each service included in the candidate service data packet.

In S502, send the reliability requirement of the candidate service data packet.

More specifically, in S501, the sending terminal knows which services are included in the candidate service data packet and the reliability requirement of each service, therefore the sending terminal can determine the reliability requirement of the candidate service data packet based on a reliability requirement of each service included in the candidate service data packet.

In an embodiment, the reliability requirement of the candidate service data packet is a highest reliability requirement among reliability requirements of all services included in the candidate service data packet. That is, the reliability requirement of the candidate service data packet is a reliability requirement of a service having a highest reliability requirement among all services included in the candidate service data packet.

In S502, the sending terminal may send the reliability requirement of the candidate service data packet.

In an embodiment, if a receiving terminal directly reports an HARQ message to a base station, the sending terminal may send the reliability requirement of the candidate service data packet to the receiving terminal based on the SCI.

The receiving terminal may receive the reliability requirement of the candidate service data packet based on the SCI, and may also send the reliability requirement of the candidate service data packet to the base station when the receiving terminal sends an HARQ feedback message to the base station, so that the base station may determine whether to schedule a retransmission resource for the candidate service data packet based on the reliability requirement of the candidate service data packet.

In a modified embodiment, the receiving terminal may determine an HARQ feedback resource to be used by the HARQ feedback message based on a pre-configured mapping relationship between HARQ feedback resources and reliability requirements, and send the HARQ feedback message to the base station by the determined HARQ feedback resource, so that the base station may determine whether to schedule a retransmission resource for the candidate service data packet based on the pre-configured mapping relationship between HARQ feedback resources and reliability requirements. Those skilled in the art understand that, if the HARQ feedback message is an ACK, the receiving terminal may not need to forward the reliability requirement of the candidate service data packet.

Those skilled in the art understand that, in V2X communication, different services may be represented by different service identifiers, such as at least one of LogicalChannel, LogicalChannel Group, Destination and Destination index. Each service identifier corresponds to one reliability requirement. Therefore, in an embodiment, the sending terminal may determine a service identifier of the candidate service data packet after determining the candidate service data packet, and send the service identifier to the receiving terminal.

Specifically, the service identifier of the candidate service data packet may be a service identifier of a service having a highest reliability requirement among all services included in the candidate service data packet, and the service identifier of the candidate service data packet may also be service identifiers of multiple services having a highest reliability requirement among all services included in the candidate service data packet, which is not limited in the present disclosure.

Then, the receiving terminal may send an HARQ feedback message to the base station. The receiving terminal may send the service identifier of the candidate service data packet to the base station when the receiving terminal sends the HARQ feedback message to the base station, so that the base station determines the reliability requirement of the candidate service data packet.

In a modified embodiment, the receiving terminal may determine an HARQ feedback resource to be used by the HARQ feedback message based on a pre-configured mapping relationship between service identifiers and HARQ feedback resources, and send the HARQ feedback message to the base station by the determined HARQ feedback resource, so that the base station may determine whether to schedule a retransmission resource for the candidate service data packet based on the pre-configured mapping relationship between service identifiers and HARQ feedback resources.

In an embodiment, if the receiving terminal cannot directly report the HARQ message to the base station, the sending terminal may send the reliability requirement of the candidate service data packet to the base station. Specifically, after determining the reliability requirement of the candidate service data packet and receiving the HARQ feedback message sent by the receiving terminal, the sending terminal may send the reliability requirement of the candidate service data packet to the base station when the sending terminal forwards the HARQ feedback message to the base station, so that the base station may determine whether to schedule a retransmission resource for the candidate service data packet based on the reliability requirement of the candidate service data packet.

In a modified embodiment, if the receiving terminal cannot directly report the HARQ message to the base station, the sending terminal may first determine the service identifier of the candidate service data packet, then send the service identifier of the candidate service data packet to the base station.

Specifically, after determining the service identifier of the candidate service data packet and receiving the HARQ feedback message sent by the receiving terminal, the sending terminal may forward the HARQ feedback message to the base station and send the service identifier of the candidate service data packet to the base station, so that the base station may determine whether to schedule a retransmission resource for the candidate service data packet based on the service identifier of the candidate service data packet.

Figure 6:
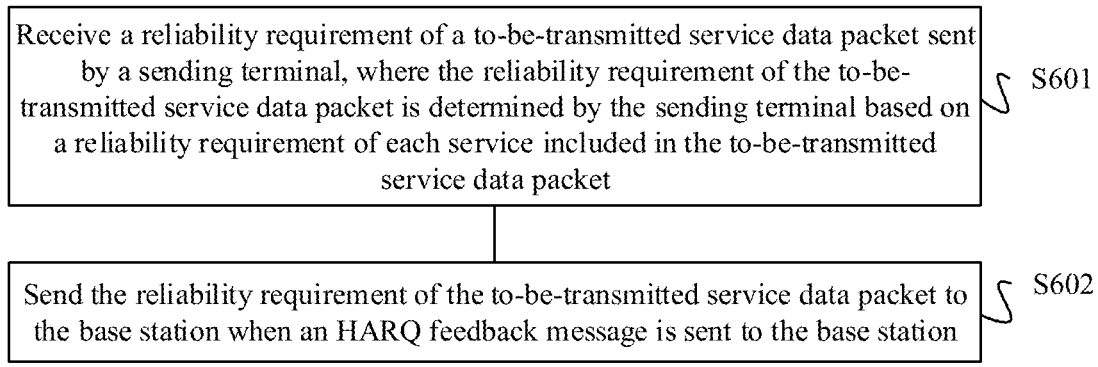
FIG. 6 is a schematic flowchart of a signaling receiving method according to an embodiment of the present disclosure.

FIG. 6 is a schematic flowchart of a signaling receiving method according to an embodiment of the present disclosure. The signaling receiving method may be performed by a terminal, for example, a NR V2X terminal. Specifically, the signaling receiving method may include the following S601 to S602.

In S601, receive a reliability requirement of a candidate service data packet sent by a sending terminal, where the reliability requirement of the candidate service data packet is determined by the sending terminal based on a reliability requirement of each service included in the candidate service data packet.

In S602, send the reliability requirement of the candidate service data packet to the base station when an HARQ feedback message is sent to the base station.

More specifically, in S601, the receiving terminal may receive the reliability requirement of the candidate service data packet from the sending terminal, the reliability requirement of the candidate service data packet is determined by the sending terminal based on the reliability requirement of each service included in the candidate service data packet.

In an embodiment, the receiving terminal may receive, based on sidelink control information, the reliability requirement of the candidate service data packet sent by the sending terminal.

In an embodiment, the reliability requirement of the candidate service data packet may refer to the service identifier of the candidate service data packet. In this case, what the receiving terminal receives is the service identifier of the candidate service data packet sent by the sending terminal.

In S602, the receiving terminal may send an HARQ feedback message to the base station, and also send the reliability requirement of the candidate service data packet to the base station.

Alternatively, the receiving terminal may send the service identifier of the candidate service data packet to the base station when the receiving terminal sends the the HARQ feedback message to the base station, so that the base station determines the reliability requirement of the candidate service data packet, and the base station further determines whether to schedule a retransmission resource for the candidate service data packet.

In an embodiment, the receiving terminal may determine an HARQ feedback resource to be used by the HARQ feedback message based on a pre-configured mapping relationship between HARQ feedback resources and reliability requirements. Then the receiving terminal may send the HARQ feedback message to the base station by the determined HARQ feedback resource. Then the base station may determine whether to schedule a retransmission resource for the candidate service data packet based on the pre-configured mapping relationship between HARQ feedback resources and reliability requirements.

In a modified embodiment, the receiving terminal may determine an HARQ feedback resource to be used by the HARQ feedback message based on a pre-configured mapping relationship between service identifiers and HARQ feedback resources. Then the receiving terminal may send the HARQ feedback message to the base station by the determined HARQ feedback resource. Then the base station may determine whether to schedule a retransmission resource for the candidate service data packet based on the pre-configured mapping relationship between service identifiers and HARQ feedback resources.

The signaling interaction between the sending terminal, the receiving terminal and the NR V2X base station according to the embodiment of the disclosure are described below in conjunction with typical application scenarios.

Figure 7:
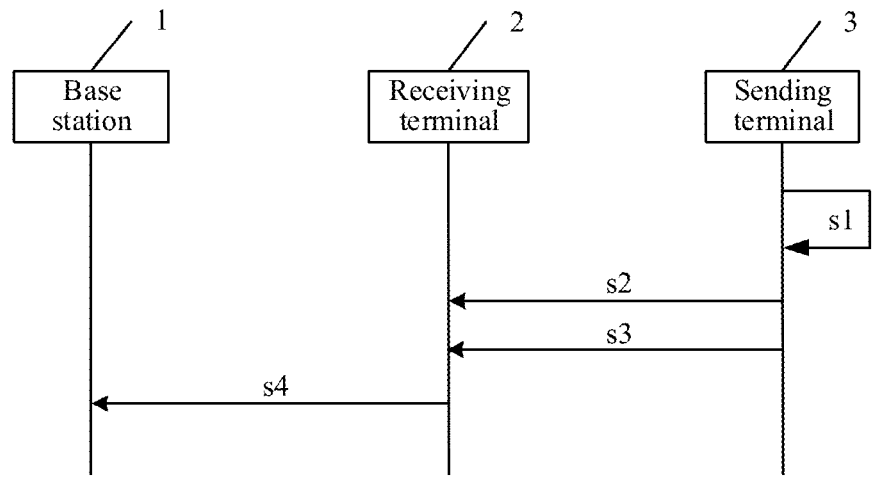
FIG. 7 is a schematic diagram of signaling interaction in a typical scenario according to another embodiment of the present disclosure.

In a typical application scenario, referring to FIG. 7, a process that a base station 1, a receiving terminal 2 and a sending terminal 3 use mode 1 for data transmission and the receiving terminal 2 feeds back HARQ information to the base station 1 may include following s1 to s4.

Firstly, the sending terminal 3 performs the s1. That is, the sending terminal 3 determines a reliability requirement of a candidate service data packet based on a reliability requirement of each service included in the candidate service data packet.

Secondly, the sending terminal 3 performs the s2. That is, the sending terminal 3 sends the reliability requirement of the candidate service data packet to the receiving terminal 2. The reliability requirement of the candidate service data packet may be transmitted based on the SCI. In an embodiment, the reliability requirement of the candidate service data packet is indicated by the service identifier of the candidate service data packet.

Then the sending terminal 3 performs the s3. That is, the sending terminal 3 sends the candidate service data packet to the receiving terminal 2.

Furthermore, the receiving terminal 2 performs the s4. That is, the receiving terminal 2 receives the candidate service data packet, and sends the HARQ feedback message of the candidate service data packet to the base station 1. The receiving terminal 2 forwards the reliability requirement of the candidate service data packet when the receiving terminal 2 sends the HARQ feedback message. In an embodiment, the receiving terminal 2 forwards the service identifier of the candidate service data packet when the receiving terminal 2 sends the HARQ feedback message.

For more details on the operation principles and operation modes of the base station 1, the receiving terminal 2 and the sending terminal 3 in the application scenario shown in FIG. 7, reference may be made to the related descriptions for the foregoing FIG. 5 and FIG. 6, which are not repeated here.

Figure 8:
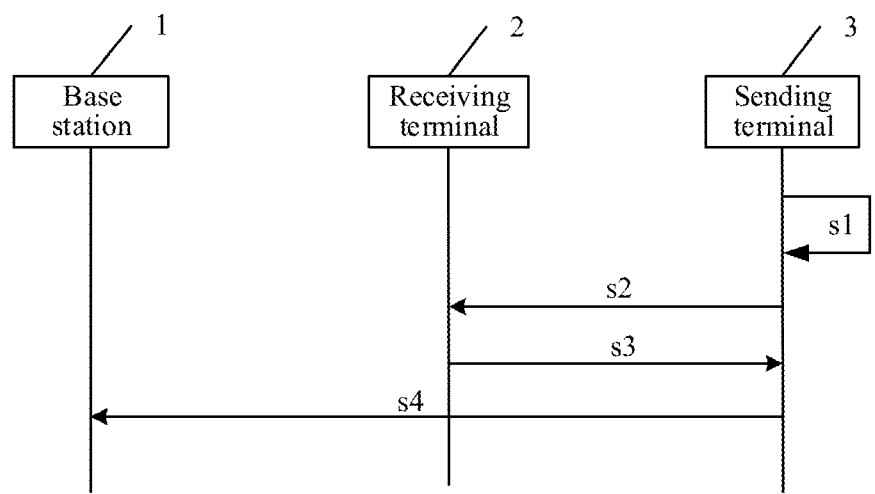
FIG. 8 is a schematic diagram of signaling interaction in a typical scenario according to another embodiment of the present disclosure.

In another typical application scenario, referring to FIG. 8, a process that a base station 1, a receiving terminal 2 and a sending terminal 3 use mode 1 for data transmission and the receiving terminal 2 feeds back HARQ information to the sending terminal 3 may include following s1 to s4.

Firstly, the sending terminal 3 performs the s1. That is, the sending terminal 3 determines a reliability requirement of a candidate service data packet based on a reliability requirement of each service included in the candidate service data packet. In an embodiment, the reliability requirement of the candidate service data packet is indicated by the service identifier of the candidate service data packet.

Secondly, the sending terminal 3 performs the s2. That is, the sending terminal 3 sends the candidate service data packet to the receiving terminal 2.

Then the receiving terminal 2 performs the s3. That is, the receiving terminal 2 sends the HARQ feedback message of the candidate service data packet to the sending terminal 3.

Furthermore, the sending terminal 3 performs the s4. That is, the sending terminal 3 forwards the HARQ feedback message to the base station 1, and sends the reliability requirement of the candidate service data packet or the service identifier of the candidate service data packet to the base station 1.

For more details on the operation principles and operation modes of the base station 1, the receiving terminal 2 and the sending terminal 3 in the application scenario shown in FIG. 8, reference may be made to the related descriptions for the foregoing FIG. 5 and FIG. 6, which are not repeated here.

It can be seen form the above content that, according to the technical solutions provided by the embodiments of the present disclosure, the base station may determine whether to schedule a retransmission resource for the candidate service data packet according to the reliability requirement of the received candidate service data packet, thereby reducing redundant data retransmissions and improving a resource utilization.

Figure 9:
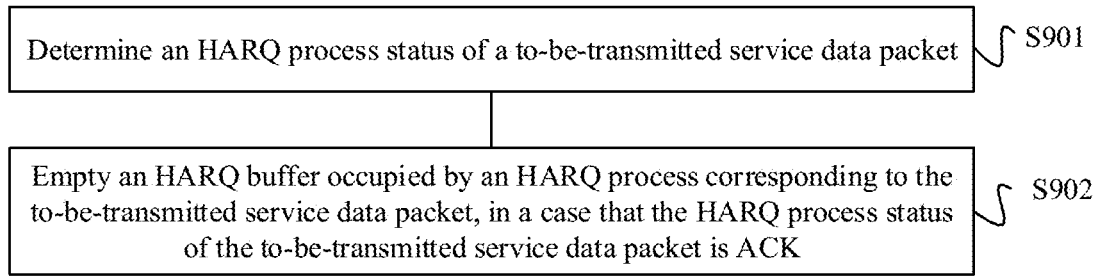
FIG. 9 is a schematic diagram of a method for updating an HARQ buffer according to another embodiment of the present disclosure.

FIG. 9 is a schematic flowchart of a method for updating an HARQ buffer according to an embodiment of the present disclosure. The method may be performed by a terminal. Specifically, the method may include the following S901 to S902.

In S901, determine an HARQ process status of a candidate service data packet.

In S902, empty an HARQ buffer occupied by an HARQ process corresponding to the candidate service data packet, in a case that the HARQ process status of the candidate service data packet is ACK.

More specifically, in S901, the first terminal may determine whether the HARQ process status of the candidate service data packet is ACK. In an affirmative determination, S902 is performed. That is, in a case that the HARQ process status of the candidate service data packet is ACK, the first terminal may empty an HARQ buffer occupied by an HARQ process corresponding to the candidate service data packet.

Furthermore, in a case that the HARQ process status of the candidate service data packet is ACK, the first terminal may set a time gap between initial transmission and retransmission in the SCI to 0 or a time interval between a current transmission resource and a next new transmission resource. Then the first terminal may send the SCI.

Furthermore, in a case that the HARQ process status of the candidate service data packet is ACK, the first terminal may release, if a transmission resource is a retransmission resource of an HARQ process corresponding to the candidate service data packet, the transmission resource.

Those skilled in the art understand that, the first terminal may release the transmission resource first, and then set the time gap in the SCI. The sequence of releasing the transmission resource and setting the time gap in the SCI is not limited in the embodiment of the present disclosure.

Figure 10:
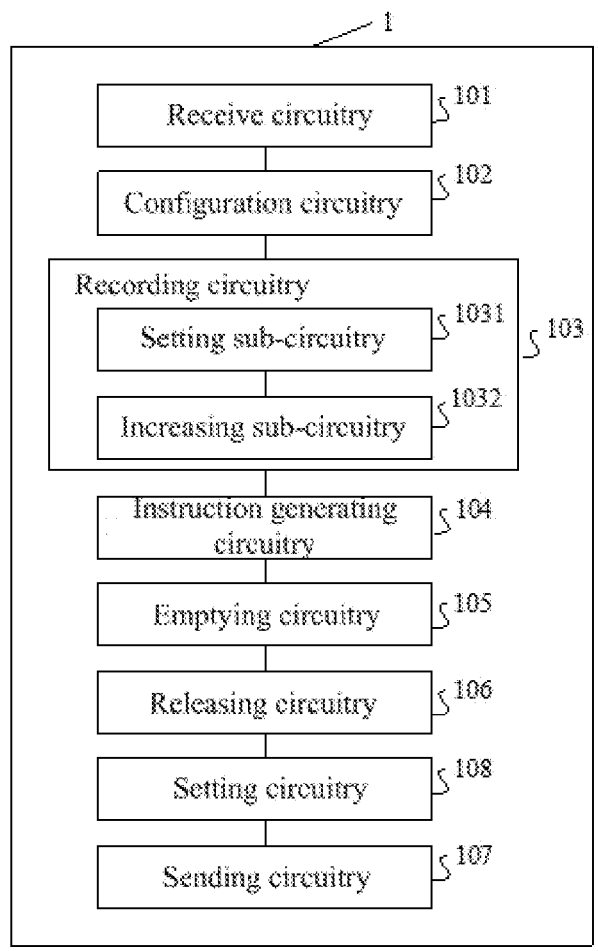
FIG. 10 is a schematic structural diagram of a service transmission device according to an embodiment of the present disclosure.

FIG. 10 is a schematic structural diagram of a service transmission device according to an embodiment of the present disclosure. The service transmission device 1 may implement the method technical solution shown in FIG. 1. The service transmission device 1 may be implemented as a terminal, for example, a NR V2X terminal.

Specifically, the service transmission device 1 may include: a receiving circuitry 101 configured to receive service configuration information, where the service configuration information includes a correspondence between a service and a quantity of times of data transmission or a correspondence between the service and a quantity of times of data retransmission; a configuration circuitry 102 configured to transmit a candidate service data packet based on the service configuration information.

In an embodiment, the service transmission device 1 may further include a recording circuitry 103 configured to record, by a counter, a quantity of times that the candidate service data packet is transmitted.

In an embodiment, the recording circuitry 103 may include: a setting sub-circuitry 1031 configured to set a count value of the counter to 0 when the candidate service data packet is transmitted for the first time; and an increasing sub-circuitry 1032 configured to increase the count value of the counter by one when the candidate service data packet is retransmitted once.

In an embodiment, the service configuration information includes the correspondence between a service and a quantity of times of data transmission, and the recording circuitry 103 may be configured to: determine a maximum of times of transmission of the candidate service data packet based on the correspondence between a service and a quantity of times of data transmission; set a count value of the counter to the maximum of times of transmission when the candidate service data packet is transmitted for the first time; and decrease the count value of the counter by one when the candidate service data packet is retransmitted once.

In an embodiment, the service configuration information includes the correspondence between a service and a quantity of times of data retransmission, and the recording circuitry 103 may be configured to: determine a maximum of times of retransmission of the candidate service data packet based on the correspondence between a service and a quantity of times of data retransmission; set a count value of the counter to the maximum of times of retransmission when the candidate service data packet is transmitted for the first time; and decrease the count value of the counter by one when the candidate service data packet is retransmitted once.

In an embodiment, the service transmission device 1 may further include an instruction generating circuitry 104 configured to: instruct a receiving terminal to send confirmation information to a base station, to make the receiving terminal send confirmation information generated by the receiving terminal to the base station, in a case that the count value of the counter meets a preset condition; or generate confirmation information and send the confirmation information to the base station, in a case that the count value of the counter meets the preset condition.

In an embodiment, the service transmission device 1 may further include an emptying circuitry 105 configured to: empty an HARQ buffer occupied by an HARQ process corresponding to the candidate service data packet, in a case that the count value of the counter meets a preset condition.

In an embodiment, the service transmission device 1 may further include an releasing circuitry 106 configured to: release, if a transmission resource is a retransmission resource of an HARQ process corresponding to the candidate service data packet, the transmission resource in a case that the count value of the counter meets a preset condition.

In an embodiment, the service transmission device 1 may further include a sending circuitry 107 configured to: send sidelink control information to a receiving terminal.

In an embodiment, the service transmission device 1 may further include a setting circuitry 108 configured to: before sending the sidelink control information to the receiving terminal, set a time gap between initial transmission and retransmission in the sidelink control information to 0 or a time interval between a current transmission resource and a next new transmission resource in a case that the count value of the counter meets a preset condition.

For more details on the operation principles and operation modes of the service transmission device 1, reference may be made to the related descriptions for the foregoing FIG. 1, which are not repeated here.

Figure 11:
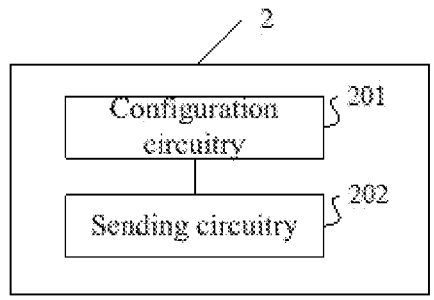
FIG. 11 is a schematic structural diagram of a device for sending service configuration according to an embodiment of the present disclosure.

FIG. 11 is a schematic structural diagram of a device for sending service configuration according to an embodiment of the present disclosure. The device for sending service configuration 2 (hereinafter referred to as the device 2 for short) may be used to implement the method technical solution shown in FIG. 2. The device 2 may be implemented as a base station, for example, NR V2X gNB.

Specifically, the device 2 may include: a configuration circuitry 201 configured to configure service configuration information, where the service configuration information includes a correspondence between a service and a quantity of times of data transmission or a correspondence between the service and a quantity of times of data retransmission; and a sending circuitry 202 configured to send the service configuration information.

For more details on the operation principles and operation modes of the device 2, reference may be made to the related descriptions for the foregoing FIG. 2, which are not repeated here.

Figure 12:
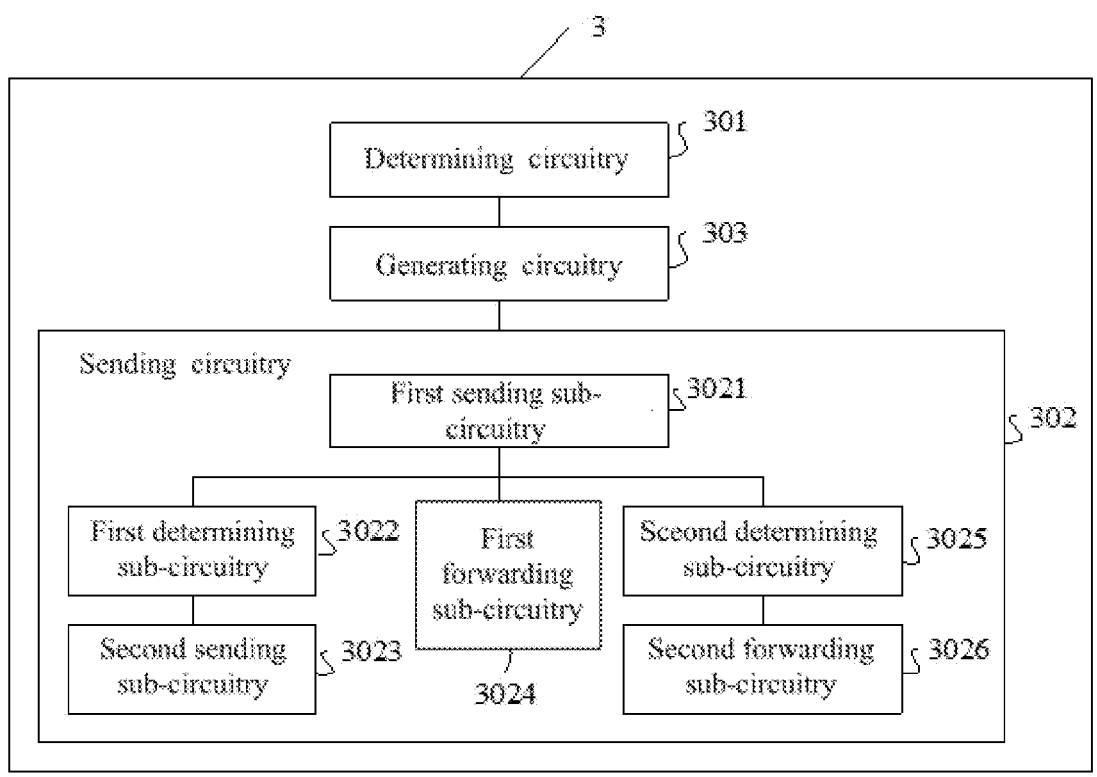
FIG. 12 is a schematic structural diagram of a signaling sending device according to an embodiment of the present disclosure.

FIG. 12 is a schematic structural diagram of a signaling sending device according to an embodiment of the present disclosure. The signaling sending device 3 may implement the method technical solution shown in FIG. 5. The signaling sending device 3 may be implemented as a terminal, for example, a NR V2X terminal.

Specifically, the signaling sending device 3 may include: a determining circuitry 301 configured to determine a reliability requirement of a candidate service data packet based on a reliability requirement of each service included in the candidate service data packet; and a sending circuitry 302 configured to send the reliability requirement of the candidate service data packet.

In an embodiment, the sending circuitry 302 may include a first sending sub-circuitry 3021 configured to send the reliability requirement of the candidate service data packet based on sidelink control information.

In an embodiment, the signaling sending device 3 may further include a generating circuitry 303 configured to: before sending the reliability requirement of the candidate service data packet, take a highest reliability requirement among reliability requirements of all services included in the candidate service data packet as the reliability requirement of the candidate service data packet.

In an embodiment, the sending circuitry 302 may include: a first determining sub-circuitry 3022 configured to determine a service identifier of the candidate service data packet; and a second sending sub-circuitry 3023 configured to send the service identifier of the candidate service data packet.

In a modified embodiment, the sending circuitry 302 may include a first forwarding sub-circuitry 3024 configured to: if the first forwarding sub-circuitry forwards a HARQ feedback message of a receiving terminal to a base station, send the reliability requirement of the candidate service data packet to the base station when the first forwarding sub-circuitry forwards the HARQ feedback message to the base station.

In a modified embodiment, the sending circuitry 302 may include: a second determining sub-circuitry 3025 configured to determine a service identifier of the candidate service data packet; a second forwarding sub-circuitry 3026 configured to, if the second forwarding sub-circuitry forwards a HARQ feedback message of a receiving terminal to a base station, send the service identifier of the candidate service data packet to the base station when the second forwarding sub-circuitry forwards HARQ feedback message to the base station, to make the base station determine the reliability requirement of the candidate service data packet.

For more details on the operation principles and operation modes of the signaling sending device 3, reference may be made to the related descriptions for the foregoing FIG. 5, which are not repeated here.

Figure 13:
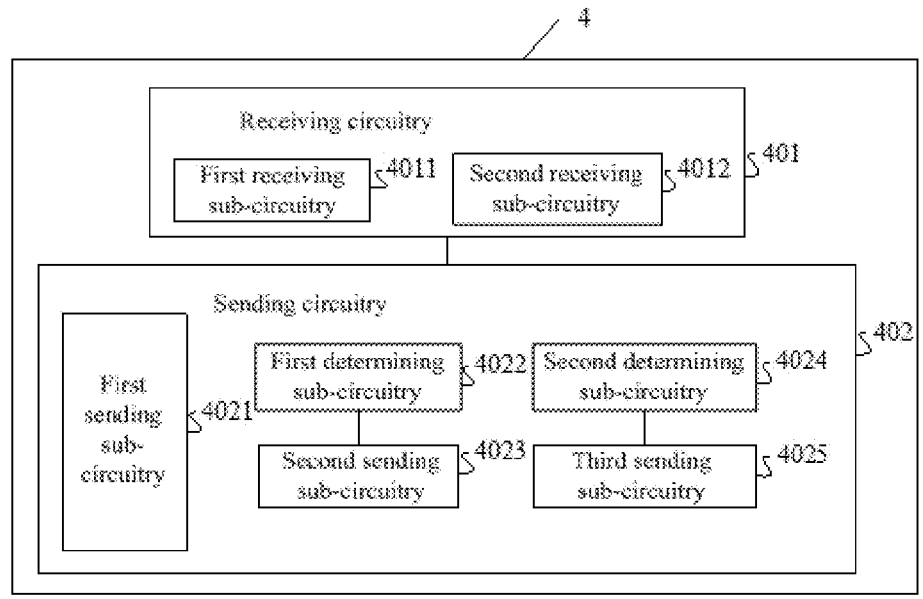
FIG. 13 is a schematic structural diagram of a signaling receiving device according to an embodiment of the present disclosure.

FIG. 13 is a schematic structural diagram of a signaling receiving device according to an embodiment of the present disclosure. The signaling receiving device 4 may be used to implement the method technical solution shown in FIG. 6. The signaling receiving device 4 may be implemented as a terminal, for example, a NR V2X terminal.

Specifically, the signaling receiving device 4 may include: a receiving circuitry 401 configured to receive a reliability requirement of a candidate service data packet sent by a sending terminal, where the reliability requirement of the candidate service data packet is determined by the sending terminal based on a reliability requirement of each service included in the candidate service data packet; and a sending circuitry 402 configured to send the reliability requirement of the candidate service data packet to the base station when the sending circuitry sends an HARQ feedback message to the base station.

In an embodiment, the receiving circuitry 401 may include a first receiving sub-circuitry 4011 configured to receive, based on sidelink control information, the reliability requirement of the candidate service data packet sent by the sending terminal.

In an optional embodiment, the reliability requirement of the candidate service data packet is a highest reliability requirement among reliability requirements of all services included in the candidate service data packet.

In an embodiment, the receiving circuitry 401 may include a second receiving sub-circuitry 4012 configured to receive a service identifier of the candidate service data packet sent by the sending terminal.

In an embodiment, the sending circuitry 402 may include a first sending sub-circuitry 4021 configured to: send the service identifier of the candidate service data packet to the base station when the first sending sub-circuitry sends the HARQ feedback message to the base station, to make the base station determine the reliability requirement of the candidate service data packet.

In an embodiment, the sending circuitry 402 may include: a first determining sub-circuitry 4022 configured to determine an HARQ feedback resource to be used by the HARQ feedback message based on a pre-configured mapping relationship between HARQ feedback resources and reliability requirements; and a second sending sub-circuitry 4023 configured to send the HARQ feedback message to the base station by the determined HARQ feedback resource.

In an embodiment, the sending circuitry 402 may include: a second determining sub-circuitry 4024 configured to determine an HARQ feedback resource to be used by the HARQ feedback message based on a pre-configured mapping relationship between service identifiers and HARQ feedback resources; and a third sending sub-circuitry 4025 configured to send the HARQ feedback message to the base station by the determined HARQ feedback resource.

For more details on the operation principles and operation modes of the signaling receiving device 4, reference may be made to the related descriptions for the foregoing FIG. 6, which are not repeated here.

Figure 14:
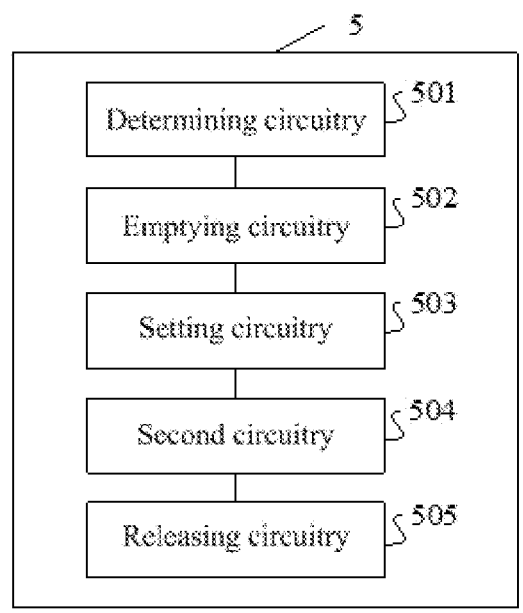
FIG. 14 is a schematic structural diagram of a device for updating an HARQ buffer according to an embodiment of the present disclosure.

FIG. 14 is a schematic structural diagram of a device for updating an HARQ buffer according to an embodiment of the present disclosure. The device for updating an HARQ buffer 5 (hereinafter referred to as the device 5 for short) may be implemented as a terminal, for example, a V2X UE.

Specifically, the device 5 may include: a determining circuitry 501 configured to determine an HARQ process status of a candidate service data packet; and an emptying circuitry 502 configured to empty an HARQ buffer occupied by an HARQ process corresponding to the candidate service data packet, in a case that the HARQ process status of the candidate service data packet is ACK.

Furthermore, the device 5 may further include: a setting circuitry 503 configured to set a time gap between initial transmission and retransmission in the SCI to 0 or a time interval between a current transmission resource and a next new transmission resource, in a case that the HARQ process status of the candidate service data packet is ACK; and a sending circuitry 504 configured to send the SCI.

Furthermore, the device 5 may further include: a releasing circuitry 505 configured to release, if a transmission resource is a retransmission resource of an HARQ process corresponding to the candidate service data packet, the transmission resource in a case that the HARQ process status of the candidate service data packet is ACK.

Furthermore, a storage medium is provided according to an embodiment of the present disclosure. The storage medium stores computer instructions. The computer instructions, when the computer instructions are executed, perform the method technical solutions in the embodiments shown in FIG. 1 and FIG. 2 or the method technical solutions in the embodiments shown in FIG. 5, FIG. 6 and FIG. 9. Preferably, the storage medium may include a computer-readable storage medium. The storage medium may include ROM, RAM, magnetic disk or optical disk, etc.

Furthermore, a terminal is provided according to an embodiment of the present disclosure. The terminal includes a memory and a processor. The memory stores computer instructions capable of being executed on the processor. The processor performs, when the computer instructions are executed by the processor, the method technical solution in the embodiments shown in FIG. 1 or FIG. 5 or FIG. 6 or FIG. 9. Preferably, the terminal may interact with the base station and other terminals. Specifically, the terminal may be an NR V2X terminal.

Furthermore, a base station is provided according to an embodiment of the present disclosure. The base station includes a memory and a processor. The memory stores computer instructions capable of being executed on the processor. The processor performs, when the computer instructions are executed by the processor, the method technical solution in the embodiments shown in FIG. 2. In an embodiment, the base station may be an NR V2X base station.

It should be understood that, in embodiments of the present disclosure, the processor may be a Central Processing Unit (called as CPU for short), and the processor may also be other general-purpose processors or a Digital Signal Processor (called as DSP for short), an Application Specific Integrated Circuit (called as ASIC for short), a Field Programmable Gate Array (called as FPGA for short) or other programmable logic devices, a discrete gate or a transistor logic device, a discrete hardware component, etc. The general-purpose processor may be a microprocessor or any conventional processor or the like.

It should also be understood that the memory in the embodiments of the present disclosure may be a volatile memory or a non-volatile memory, or may include both a volatile and a non-volatile memory. The non-volatile memory may be a Read-Only Memory (called as ROM for short), a Programmable ROM (called as PROM for short), and an Erasable PROM (called as EPROM for short), an Electrically EPROM (called as EEPROM for short) or a flash memory. The volatile memory may be a Random Access Memory (called as RAM for short), which is used as an external cache. By way of exemplary but not restrictive description, many forms of Random Access Memory (called as RAM for short) are available, such as a Static RAM (called as SRAM for short) and a Dynamic Random Access Memory (called as DRAM for short), a Synchronous DRAM (called as SDRAM for short), a Double Data Rate SDRAM (called as DDR SDRAM for short), an Enhanced SDRAM (called as ESDRAM for short), a Synchronous connection to DRAM (called as SLDRAM for short) and a Direct Rambus RAM (called as DR-RAM for short).

The foregoing embodiments may be implemented entirely or partially by software, hardware, firmware or any combination thereof. When the embodiments are implemented by software, all or some of the embodiments may be implemented in a form of a computer program product. The computer program product includes one or more computer instructions or computer programs. When the computer instructions or computer programs are loaded and executed on a computer, all or some of the processes or functions according to the embodiments of the present disclosure are produced. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, a computer, server, or a data center to another website, computer, server, or data center in a wired (for example, infrared, radio, or microwave) manner. The computer readable storage medium may be any available medium capable of being accessed by a computer or may be a data storage device including one or more available medium, such as a server and a data center. The available medium may be a magnetic medium (for example, a floppy disk, a hard disk, or a magnetic tape), an optical medium (for example, a DVD), a semiconductor medium. The semiconductor medium may be a solid state hard disk.

It should be understood that, serial numbers of the processes in the foregoing embodiments of the disclosure do not refer to a sequence according to which the methods are performed. The sequence according to which the methods are performed is determined by functions and internal logic thereof, and should not constitute any limitation on the implementation process of the embodiments of the present disclosure.

In the embodiments according to the present disclosure, it should be understood that the disclosed method, device and system may be implemented in other ways. For example, the device embodiments described above are only exemplary. For example, the division of the units is only a logical function division. There may be other division methods in practical application, for example, multiple units or components may be combined or integrated into another system, or some features may be disregarded or not implemented. In addition, the mutual coupling, direct coupling, communication connection shown or discussed may be indirect coupling or communication connection via some interfaces, devices or units, and may be in an electrical form, a mechanical form or other forms.

The above units described as separate components may be or may be not separated physically. The component displayed as a unit may be or may be not a physical unit, that is, may be located at one place or may be distributed on multiple network units. The object of the solution of the embodiments may be achieved by selecting a part or all of the units according to the actual requirements.

In addition, function units according to embodiments of the present disclosure may be integrated into one processing unit, or the units are physically independent from each other, or two or more units are integrated into one unit. The integrated unit described above may be realized with hardware, or may be realized by hardware plus a software function unit.

The above-mentioned integrated unit implemented in the form of a software functional unit may be stored in a computer readable storage medium. The above-mentioned software functional unit is stored in a storage medium, and includes several instructions to enable a computer device (which may be a personal computer, a server, or a network device, etc.) to perform some parts of the method described in each embodiment of the present disclosure. The aforementioned storage medium includes various medium which can store program code, such as a U disk, a mobile hard disk, a Read-Only Memory (called as ROM for short), a Random Access Memory (called as RAM for short), a magnetic disk or an optical disk.

Although the present disclosure is disclosed as above, the present disclosure is not limited thereto. Any person skilled in the art can make various changes and modifications without departing from the spirit and scope of the present disclosure. Therefore, the protection scope of the present disclosure should be defined by the claims.

What is claimed is:

1. A method for service transmission, comprising:
   receiving service configuration information, wherein the service configuration information comprises a correspondence between a priority and a quantity of times of data transmission or a correspondence between the priority and a quantity of times of data retransmission;
   transmitting a candidate service data packet based on the service configuration information; and
   recording, by a counter, a quantity of times that the candidate service data packet is transmitted;
   wherein the method further comprises:
   emptying an HARQ buffer occupied by an HARQ process corresponding to the candidate service data packet, and instructing a receiving terminal to send ACKnowledgement (ACK) to a base station, to make the receiving terminal send the ACK generated by the receiving terminal to the base station, on the basis that the count value of the counter meets a preset condition; or
   emptying the HARQ buffer occupied by the HARQ process corresponding to the candidate service data packet, and generating ACK and sending the ACK to the base station, on the basis that the count value of the counter meets the preset condition.

2. The method according to claim 1, wherein said recording, by a counter, a quantity of times that the candidate service data packet is transmitted comprises:
   setting a count value of the counter to 0 when the candidate service data packet is transmitted for the first time; and
   increasing the count value of the counter by one when the candidate service data packet is retransmitted once.

3. The method according to claim 1, wherein the service configuration information comprises the correspondence between a priority and a quantity of times of data transmission, and the recording, by a counter, a quantity of times that the candidate service data packet is transmitted comprises:
   determining a maximum of times of transmission of the candidate service data packet based on the correspondence between a priority and a quantity of times of data transmission;

setting a count value of the counter to the maximum of times of transmission when the candidate service data packet is transmitted for the first time; and decreasing the count value of the counter by one when the candidate service data packet is retransmitted once.

4. The method according to claim 1, wherein the service configuration information comprises the correspondence between a priority and a quantity of times of data retransmission, and the recording, by a counter, a quantity of times that the candidate service data packet is transmitted comprises:

determining a maximum of times of retransmission of the candidate service data packet based on the correspondence between a priority and a quantity of times of data retransmission;

setting a count value of the counter to the maximum of times of retransmission when the candidate service data packet is transmitted for the first time; and decreasing the count value of the counter by one when the candidate service data packet is retransmitted once.

5. The method according to claim 1, further comprising: releasing, if a transmission resource is a retransmission resource of an HARQ process corresponding to the candidate service data packet, the transmission resource on the basis that the count value of the counter meets the preset condition.

6. The method according to claim 1, further comprising: sending sidelink control information to a receiving terminal.

7. The method according to claim 6, wherein prior to sending the sidelink control information to the receiving terminal, the service transmission method further comprises:

setting a time gap between initial transmission and retransmission in the sidelink control information to 0 or a time interval between a current transmission resource and a next new transmission resource, on a basis that the count value of the counter meets the preset condition.

8. A method for sending service configuration, comprising:

configuring service configuration information, wherein the service configuration information comprises a correspondence between a priority and a quantity of times of data transmission or a correspondence between the priority and a quantity of times of data retransmission; and sending the service configuration information to a sending terminal, to make the sending terminal perform following steps: recording, using a counter, a quantity of times that a candidate service data packet is transmitted; and emptying an HARQ buffer occupied by an HARQ process corresponding to the candidate service data packet, and instructing a receiving terminal to send ACKnowledgement (ACK) to a base station, to make the receiving terminal send the ACK generated by the receiving terminal to the base station, on the basis that the count value of the counter meets a preset condition, or, emptying the HARQ buffer occupied by the HARQ process corresponding to the candidate service data packet, and generating ACK and sending the ACK to the base station, on the basis that the count value of the counter meets the preset condition.

9. A non-transitory storage medium storing one or more programs, the one or more programs comprising computer instructions, which, when executed by a processor, cause the processor to:

receive service configuration information, wherein the service configuration information comprises a correspondence between a priority and a quantity of times of data transmission or a correspondence between the priority and a quantity of times of data retransmission;

transmit a candidate service data packet based on the service configuration information; and enable a counter to record a quantity of times that the candidate service data packet is transmitted;

wherein the processor is further caused to:

empty an HARQ buffer occupied by an HARQ process corresponding to the candidate service data packet, and instruct a receiving terminal to send ACKnowledgement (ACK) to a base station, to make the receiving terminal send the ACK generated by the receiving terminal to the base station, on the basis that the count value of the counter meets a preset condition; or empty the HARQ buffer occupied by the HARQ process corresponding to the candidate service data packet, and generate ACK and send the ACK to the base station, on the basis that the count value of the counter meets the preset condition.

10. The non-transitory storage medium according to claim 9, wherein the processor is further caused to:

set a count value of the counter to 0 when the candidate service data packet is transmitted for the first time; and increase the count value of the counter by one when the candidate service data packet is retransmitted once.

11. The non-transitory storage medium according to claim 9, wherein the service configuration information comprises the correspondence between a priority and a quantity of times of data transmission, and the processor is further caused to:

determine a maximum of times of transmission of the candidate service data packet based on the correspondence between a priority and a quantity of times of data transmission;

set a count value of the counter to the maximum of times of transmission when the candidate service data packet is transmitted for the first time; and decrease the count value of the counter by one when the candidate service data packet is retransmitted once.

12. The non-transitory storage medium according to claim 9, wherein the processor is further caused to:

release, if a transmission resource is a retransmission resource of an HARQ process corresponding to the candidate service data packet, the transmission resource on the basis that the count value of the counter meets the preset condition.

13. The non-transitory storage medium according to claim 9, wherein the processor is further caused to:

send sidelink control information to a receiving terminal.

14. The non-transitory storage medium according to claim 13, wherein the processor is further caused to:

before sending the sidelink control information to the receiving terminal, set a time gap between initial transmission and retransmission in the sidelink control information to 0 or a time interval between a current transmission resource and a next new transmission resource, on a basis that the count value of the counter meets the preset condition.

* * * * *